United States Patent
Salsbury

(10) Patent No.: US 10,890,346 B2
(45) Date of Patent: Jan. 12, 2021

(54) EXTREMUM-SEEKING CONTROL SYSTEM FOR ON/OFF SYSTEMS

(71) Applicant: Johnson Controls Technology Company, Auburn Hills, MI (US)

(72) Inventor: Timothy I. Salsbury, Mequon, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 10 days.

(21) Appl. No.: 16/107,628

(22) Filed: Aug. 21, 2018

(65) Prior Publication Data

US 2020/0064004 A1     Feb. 27, 2020

(51) Int. Cl.
G05B 13/02    (2006.01)
F24F 11/46    (2018.01)

(52) U.S. Cl.
CPC .............. *F24F 11/46* (2018.01); *G05B 13/02* (2013.01); *G05B 13/021* (2013.01)

(58) Field of Classification Search
CPC .......... F24F 11/46; F24F 11/65; G05B 13/021
USPC .......................................................... 700/34
See application file for complete search history.

(56) References Cited

U.S. PATENT DOCUMENTS

| | | | |
|---|---|---|---|
| 8,200,344 B2 | 6/2012 | Li et al. | |
| 8,200,345 B2 | 6/2012 | Li et al. | |
| 8,666,517 B2 | 3/2014 | Li et al. | |
| 8,694,132 B2 | 4/2014 | Li et al. | |
| 2002/0093446 A1* | 7/2002 | Horsley | G01R 31/2829 341/157 |
| 2005/0099131 A1* | 5/2005 | Amarillas | H02J 13/0006 315/64 |
| 2015/0333669 A1* | 11/2015 | Alexander | H02P 29/02 318/599 |
| 2016/0084514 A1 | 3/2016 | Salsbury et al. | |
| 2016/0132027 A1 | 5/2016 | Li et al. | |
| 2017/0176954 A1 | 6/2017 | Salsbury et al. | |
| 2017/0241657 A1 | 8/2017 | Salsbury et al. | |
| 2017/0241658 A1 | 8/2017 | Salsbury et al. | |

OTHER PUBLICATIONS

U.S. Appl. No. 15/461,222, filed Mar. 16, 2017, Johnson Controls Technology Company.

(Continued)

*Primary Examiner* — Kenneth M Lo
*Assistant Examiner* — Michael W Choi
(74) *Attorney, Agent, or Firm* — Foley & Lardner LLP

(57) ABSTRACT

An on/off system operates to affect a variable state or condition of a building by switching between an on state and an off state. An extremum-seeking controller operates the on/off system by providing a pulse width modulated (PWM) control signal having a duty cycle to the on/off system. The extremum-seeking controller is configured to generate the PWM control signal by receiving a performance variable as feedback from the on/off system, extracting a gradient of the performance variable with respect to the duty cycle, modulating the duty cycle using an extremum-seeking control technique to determine an optimal value of the duty cycle that drives the gradient toward zero, and generating the PWM control signal such that each period of the PWM control signal has a pulse width proportional to the duty cycle.

20 Claims, 9 Drawing Sheets

(56) References Cited

OTHER PUBLICATIONS

U.S. Appl. No. 15/950,009, filed Apr. 10, 2018, Johnson Controls Technology Company.
U.S. Appl. No. 16/029,246, filed Jul. 6, 2018 Johnson Controls Technology Company.
U.S. Appl. No. 16/029,255, filed Jul. 6, 2018, Johnson Controls Technology Company.
U.S. Appl. No. 16/052,120, filed Aug. 1, 2018, Timothy I. Salsbury.

* cited by examiner

EXTREMUM-SEEKING CONTROL SYSTEM FOR ON/OFF SYSTEMS

BACKGROUND

The present disclosure relates generally to an extremum-seeking control (ESC) system. ESC is a class of self-optimizing control strategies that can dynamically search for the unknown and/or time-varying inputs of a system for optimizing a certain performance index. ESC can be considered a dynamic realization of gradient searching through the use of dither signals. The gradient of the system output y with respect to the system input u can be obtained by slightly perturbing the system operation and applying a demodulation measure. Optimization of system performance can be obtained by driving the gradient towards zero by using a negative feedback loop in the closed-loop system. ESC is a non-model based control strategy, meaning that a model for the controlled system is not necessary for ESC to optimize the system.

ESC is commonly applied to systems having a variable that can be adjusted continuously over a range of operation. In such an application, ESC works by perturbing the variable with a dither signal. The variable is then continuously manipulated over the range of the variable according to continuous feedback from the system in order to achieve a desired maximum or minimum value of a function. For example, it may be desirable to maximize an efficiency function, while it may be desirable to minimize a cost function.

In the case of two-position systems, there may still be a desire to drive a variable to an extremum so as to maximize or minimize a function. Contrary to the systems typically used with ESC, in two-position systems there is not a variable to be adjusted over a continuous range of operation. In the application of ESC to two position systems, time spent in two possible states of the system (on/off, open closed, etc.) can be manipulated in order to drive a variable to an extremum, the extremum being a maximum or minimum. The difficulty in determining the optimum operating conditions for two-position systems is that the optimum may exist at one of the extreme conditions, or may also exist somewhere in between the extreme conditions. Thus, in order to apply ESC to two-positions systems, the optimum operating conditions for the system must be found differently than for systems with a variable that can be continuously adjusted over a range of operation.

SUMMARY

One implementation of the present disclosure is an extremum-seeking controller for on/off systems. The system includes an on/off system operable to affect a variable state or condition of a building by switching between an on state and an off state. The system also includes a controller configured to operate the on/off system by providing a pulse width modulated (PWM) control signal having a duty cycle to the on/off system, with the PWM control signal causing the on/off system to operate to affect the variable state or condition of the building. The controller is configured to receive a performance variable as feedback from the on/off system, extract a gradient of the performance variable with respect to the duty cycle, modulate the duty cycle using an extremum-seeking control technique to determine an optimal value of the duty cycle that drives the gradient toward zero, and generate the PWM control signal such that each period of the PWM control signal has a pulse width proportional to the duty cycle.

In some embodiments, the controller comprises one or more filters configured to process the performance variable feedback from the on/off system before the controller extracts the gradient of the performance variable with respect to the duty cycle. In certain embodiments, the period of the PWM control signal is defined by a user. Additionally, in some embodiments wherein the PWM control signal generated is a pulse train, with each pulse of the pulse train having a constant amplitude.

In some embodiments, the pulse width of the pulse train is determined by an input signal such that a value of the duty cycle will be equal to a percentage of a cycle period occupied by a pulse. In certain embodiments, the controller is configured to identify a change in the duty cycle resulting from modulating the duty cycle to drive the gradient toward zero, and update the pulse width such that the pulse width is maintained proportional to the duty cycle after the change in the duty cycle.

In some embodiments, the controller is configured to determine a steady-state value of the duty cycle that drives the performance gradient toward zero, and perturb the steady-state value of the duty cycle with a dither signal to determine the duty cycle of the PWM control signal. In certain embodiments, the controller is configured to drive the performance variable toward an extremum by driving the gradient toward zero, the extremum comprising a maximum or minimum of the performance variable.

In some embodiments, the one or more filters receive and process the performance variable from the on/off system prior to a calculation of the duty cycle. In certain embodiments, the PWM control signal is continuously adjusted and outputted to the on/off system for a period equal to that for which the performance variable is received as feedback.

Another implementation of the present disclosure is a method for system control. The method includes affecting a variable state or condition of a building by switching between an on state and an off state using. The method also includes operating a controller to provide a pulse width modulated (PWM) control signal having a duty cycle to the on/off system, the PWM control signal causing the on/off system to operate to affect the variable state or condition of the building. Operating the controller also includes receiving a performance variable as feedback from the on/off system, extracting a gradient of the performance variable with respect to the duty cycle, modulating the duty cycle using an extremum-seeking control technique to determine an optimal value of the duty cycle that drives the gradient toward zero, and generating the PWM control signal such that each period of the PWM control signal has a pulse width proportional to the duty cycle.

In some embodiments, the performance variable received from the on/off system is processed by one or more filters prior to the extraction of the gradient of the performance variable with respect to the duty cycle. In certain embodiments, the generating of the PWM control signal is determined by an input signal such that a value of the duty cycle will be equal to a percentage of a cycle period occupied by a pulse. Additionally, in some embodiments the cycle period of the PWM control signal is user-defined.

In some embodiments, the width of the pulses of the generated PWM control signal are determined such that the value of the duty cycle will be equal to the pulse width as a percentage of the cycle period. In certain embodiments operating the controller includes identifying a change in the duty cycle resulting from modulating the duty cycle to drive the gradient toward zero, and updating the pulse width such that the pulse width is maintained proportional to the duty cycle after the change in the duty cycle.

In some embodiments, the PWM control signal generated has a constant amplitude. In certain embodiments, extracting the gradient of the performance variable with respect to the duty cycle includes perturbation using a dither signal.

In some embodiments, determining the optimal value of the duty cycle corresponds to a PWM control signal configured to drive the performance variable to a desired extremum. In certain embodiments, generating the PWM control signal is continuous, the PWM control signal being adjusted and outputted to the on/off system for a period equal to that for which the performance variable is received as feedback.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
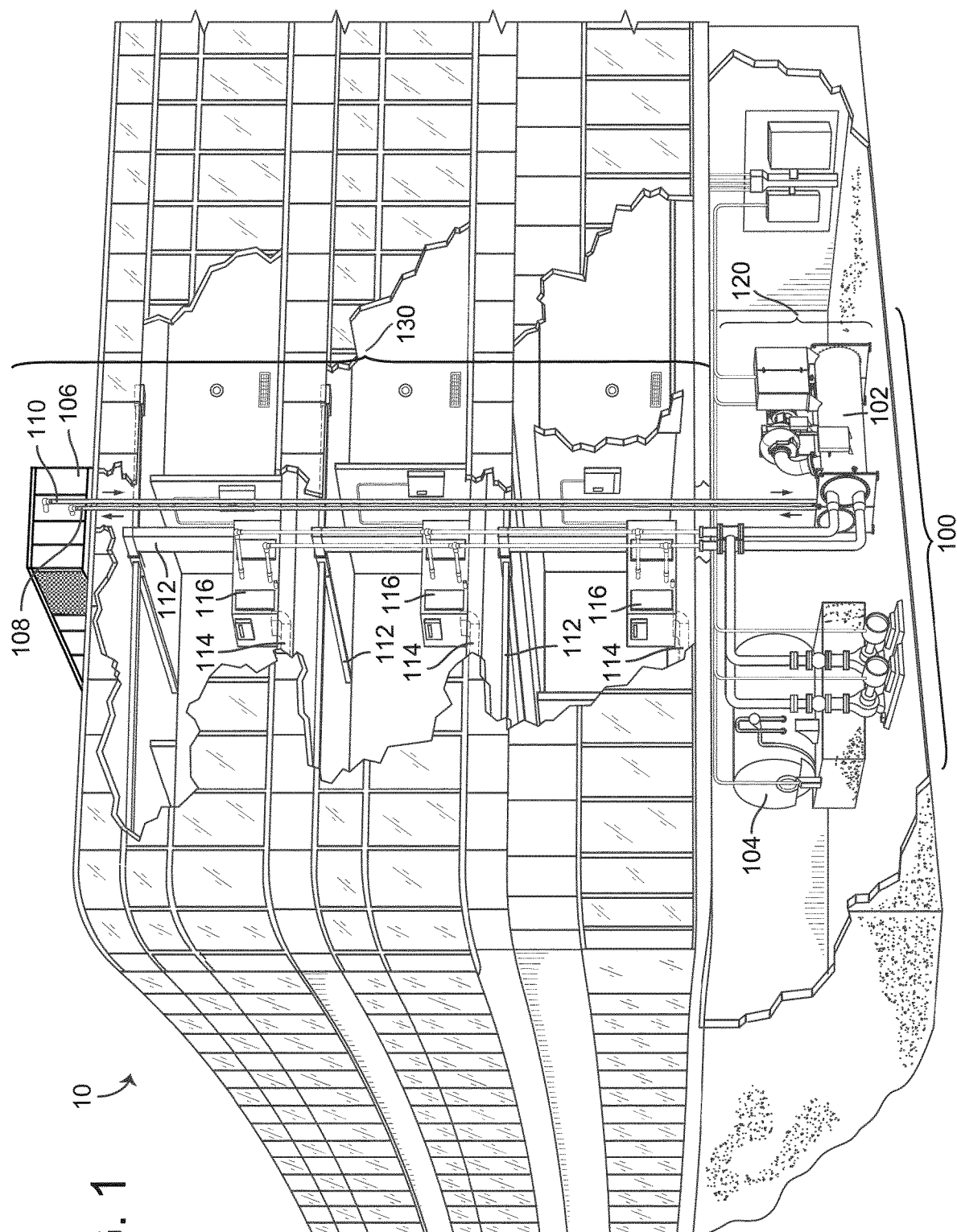
FIG. 1 is a drawing of a building equipped with a HVAC system, according to some embodiments.

The present disclosure relates to an ESC system applied to an on/off system, without the need to modify the ESC algorithm. This expands the utility of ESC considerably, specifically in the use in buildings with two-position (on/off) systems. Common on/off systems include two-position valves, single-speed compressors, fans, and pumps. An on/off system, by nature, has only two settings—on and off. As such, optimizing efficiency in terms of energy and power consumption presents substantial difficulty. However, by adjusting the duration that the system is in the on and off positions there is an opportunity for increased efficiency. In most cases, the ultimate goal of increased efficiency of a system is cost reduction. The incorporation of ESC into an on/off system allows for optimized system efficiency, and ultimately a reduction in operating cost.

ESC is a real-time optimization method that adjusts the level of a manipulated variable in order to minimize or maximize a cost function. This manipulated variable is assumed to be adjustable over a range and the implementation of ESCperturbs this variable by applying a known signal such as a sine wave. For the application of this invention—two-position systems—the optimum value of the manipulated variable may exist at one of the extreme conditions (the minimum or maximum) or somewhere in between.

Referring generally to the FIGURES, an extremum-seeking control (ESC) system for an on/off system is shown, according to various exemplary embodiments.

The nature of an on/off or any other two-position system is that the system may have only two possible operating states. As such, it is not possible to apply ESC to an on/off system in the same manner that ESC is applied to systems that may have a variable adjustable over a range. In a system in which the variable may be adjustable over the range, the implementation of ESC can allow for continuous adjustment over that range in order to drive performance of the system toward an extremum for a specified function. On/off systems, however, can lack the adjustable range for the variable and thus may not function with ESC control in the same manner as a system having the variable with the adjustable range. This key distinction of on/off systems can require an alternative approach to the application of ESC.

The only adjustment that may be made on an on/off system or other two-position system is a switch from one of the possible operating states to the other, according to some embodiments. The objective of applying ESC to on/off systems can be to find an optimum for operation of the system, with the optimum possibly existing at one of the extreme conditions (being on or off) or somewhere in between. The application of ESC to on/off systems on this invention can determine the optimum for the system to drive the variable toward a desired extremum. Contrary to typical ESC applications in which ESC may find the optimum by adjusting the variable continuously over a range, ESC for on/off systems can determine the optimum operating condition for the system in terms of the percentage of a user-defined cycle period that the system spends in one or both of the on and off positions. Similar to the ESC application to systems in which the variable may have an adjustable range, the application of ESC to on/off systems can be continuous in its adjustment of the time spent in the on/off positions based on feedback of the variable.

Building HVAC Systems and Building Management Systems

Figure 2:
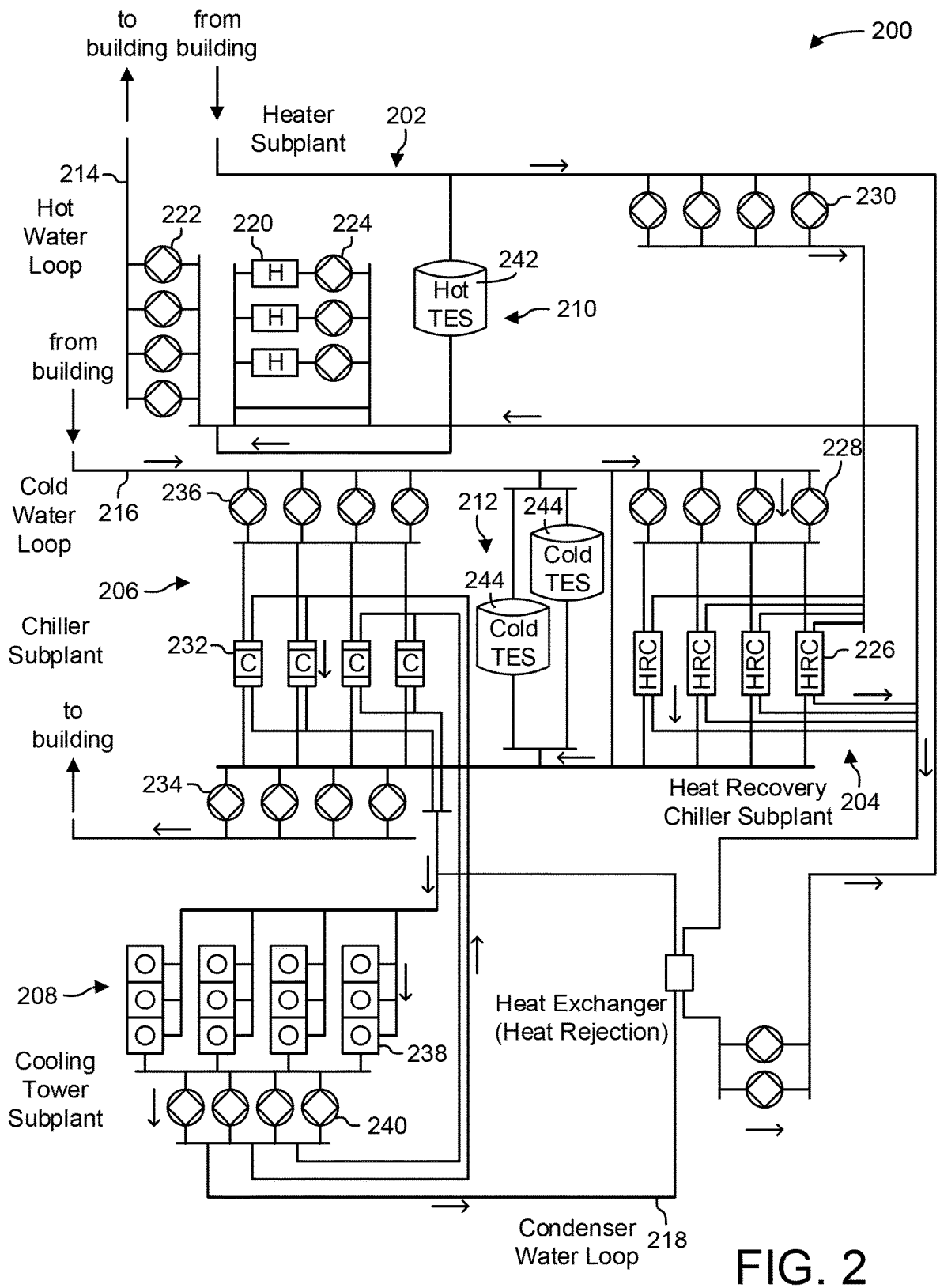
FIG. 2 is a schematic diagram of a waterside system which can be used in conjunction with the building of FIG. 1, according to some embodiments.
Figure 3:
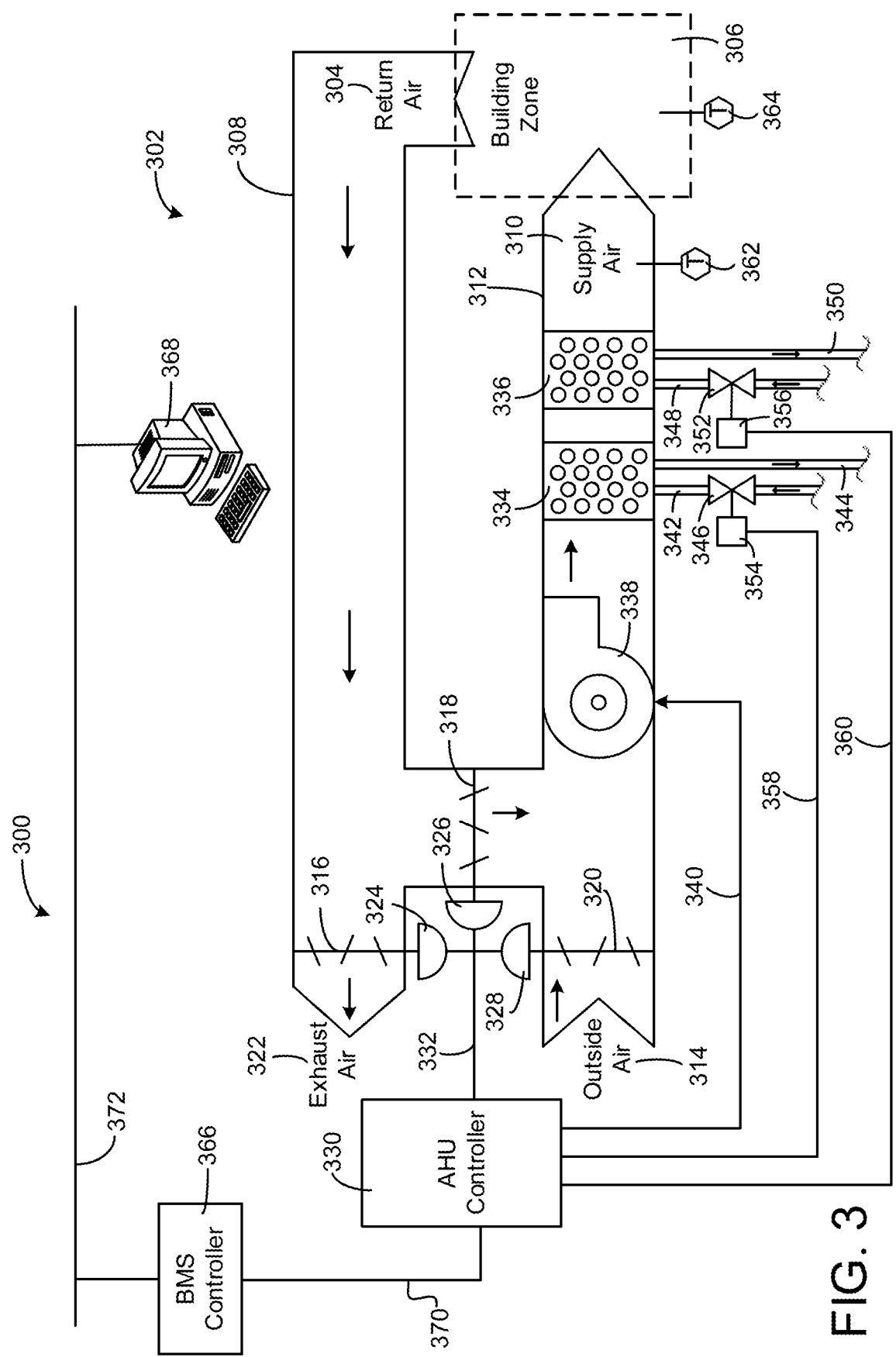
FIG. 3 is a schematic diagram of an airside system which can be used in conjunction with the building of FIG. 1, according to some embodiments.
Figure 4:
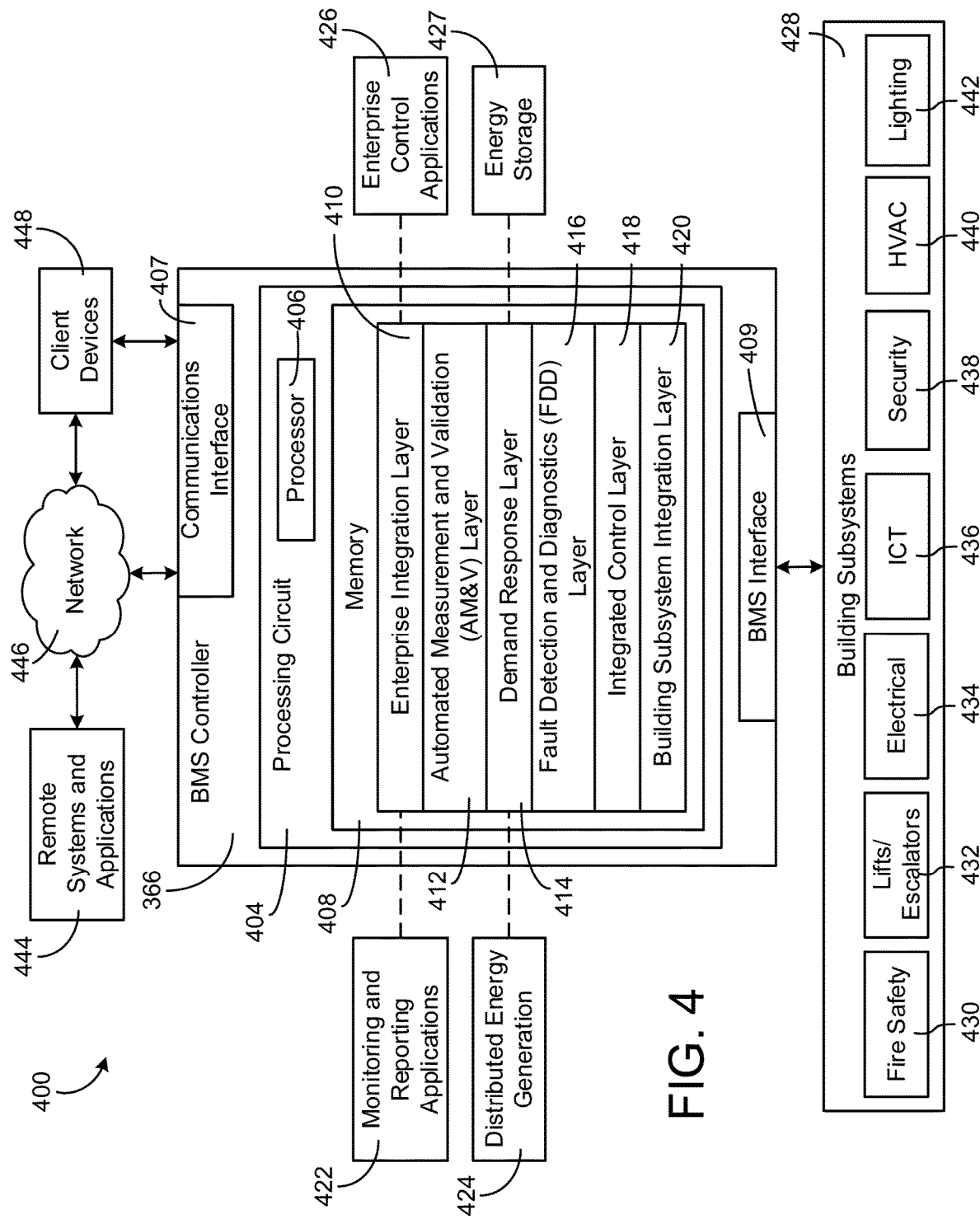
FIG. 4 is a block diagram of a building management system (BMS) which can be used to monitor and control the building of FIG. 1, according to some embodiments.
Figure 5:
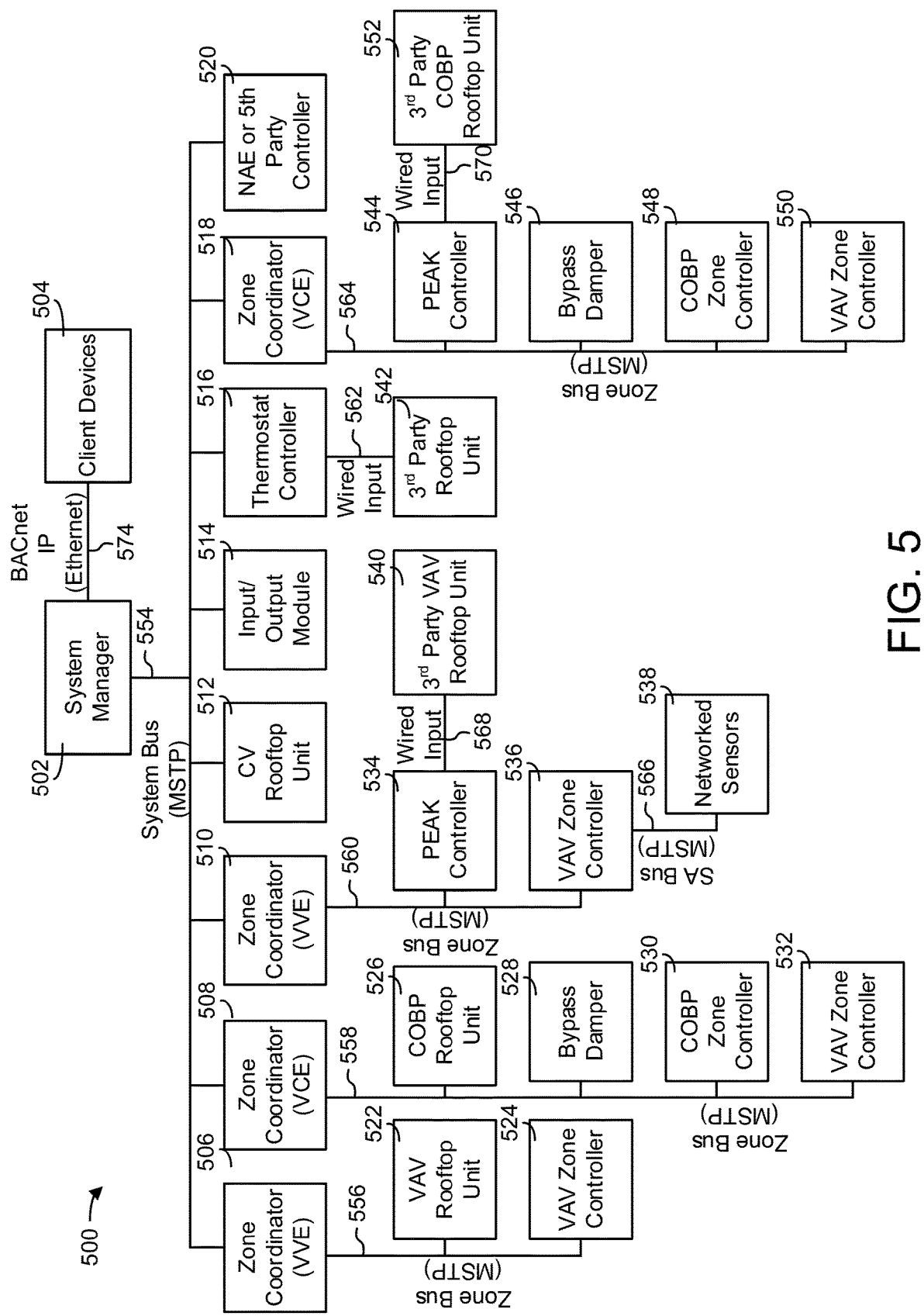
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Extremum-Seeking Control Systems

Figure 6:
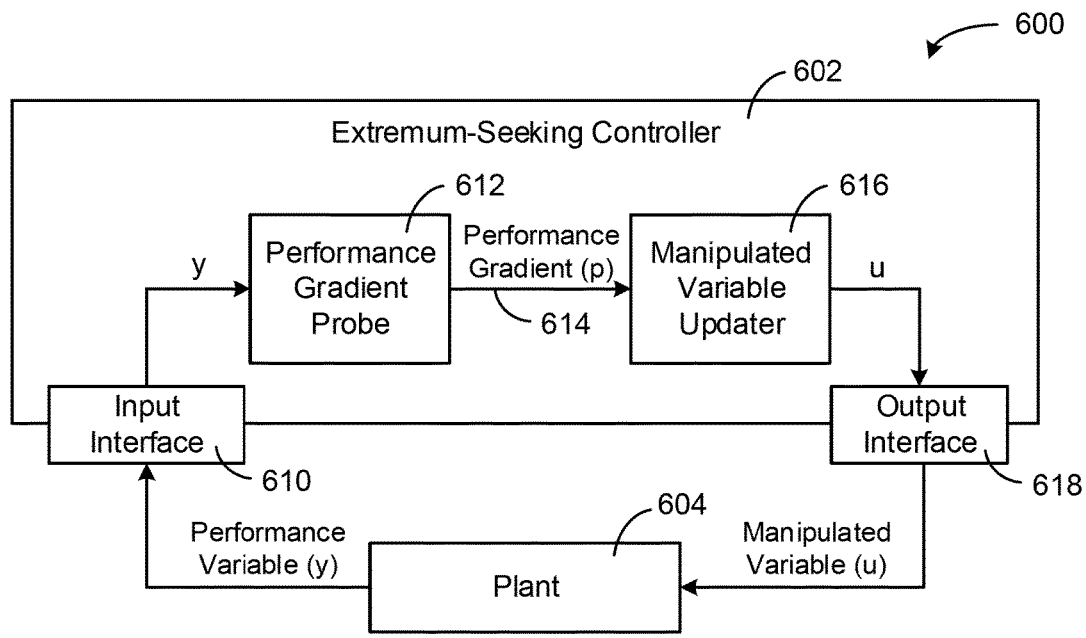
FIG. 6 is a block diagram of an extremum-seeking control (ESC) system which uses a periodic dither signal to perturb a control input provided to a plant, according to some embodiments.

Referring now to FIG. 6, a block diagram of an extremum-seeking control (ESC) system 600 with a periodic dither signal is shown, according to some embodiments. ESC system 600 is shown to include an extremum-seeking controller 602 and a plant 604. A plant in control theory is the combination of a process and one or more mechanically-controlled outputs. For example, plant 604 can be an air handling unit configured to control temperature within a building space via one or more mechanically-controlled actuators and/or dampers. In various embodiments, plant 604 can include a chiller operation process, a damper adjustment process, a mechanical cooling process, a ventilation process, a refrigeration process, or any other process in which an input variable to plant 604 (i.e., manipulated variable u) is adjusted to affect an output from plant 604 (i.e., performance variable y).

Extremum-seeking controller 602 uses extremum-seeking control logic to modulate the manipulated variable u. For example, controller 602 may use a periodic (e.g., sinusoidal) perturbation signal or dither signal to perturb the value of manipulated variable u in order to extract a performance gradient p. The manipulated variable u can be perturbed by adding periodic oscillations to a DC value of the performance variable u, which may be determined by a feedback control loop. The performance gradient p represents the gradient or slope of the performance variable y with respect to the manipulated variable u. Controller 602 uses extremum-seeking control logic to determine a value for the manipulated variable u that drives the performance gradient p to zero.

Controller 602 may determine the DC value of manipulated variable u based on a measurement or other indication of the performance variable y received as feedback from plant 604 via input interface 610. Measurements from plant 604 can include, but are not limited to, information received from sensors about the state of plant 604 or control signals sent to other devices in the system. In some embodiments, the performance variable y is a measured or observed position of one of valves 354-356. In other embodiments, the performance variable y is a measured or calculated amount of power consumption, a fan speed, a damper position, a temperature, or any other variable that can be measured or calculated by plant 604. Performance variable y can be the variable that extremum-seeking controller 602 seeks to optimize via an extremum-seeking control technique. Performance variable y can be output by plant 604 or observed at plant 604 (e.g., via a sensor) and provided to extremum-seeking controller at input interface 610.

Input interface 610 provides the performance variable y to performance gradient probe 612 to detect the performance gradient 614. Performance gradient 614 may indicate a slope of the function y=f(u), where y represents the performance variable received from plant 604 and u represents the manipulated variable provided to plant 604. When performance gradient 614 is zero, the performance variable y has an extremum value (e.g., a maximum or minimum). Therefore, extremum-seeking controller 602 can optimize the value of the performance variable y by driving performance gradient 614 to zero.

Manipulated variable updater 616 produces an updated manipulated variable u based upon performance gradient 614. In some embodiments, manipulated variable updater 616 includes an integrator to drive performance gradient 614 to zero. Manipulated variable updater 616 then provides an updated manipulated variable u to plant 604 via output interface 618. In some embodiments, manipulated variable u is provided to one of dampers 324-328 (FIG. 2) or an actuator affecting dampers 324-328 as a control signal via output interface 618. Plant 604 can use manipulated variable u as a setpoint to adjust the position of dampers 324-328 and thereby control the relative proportions of outdoor air 314 and return air 304 provided to a temperature-controlled space.

Figure 7:
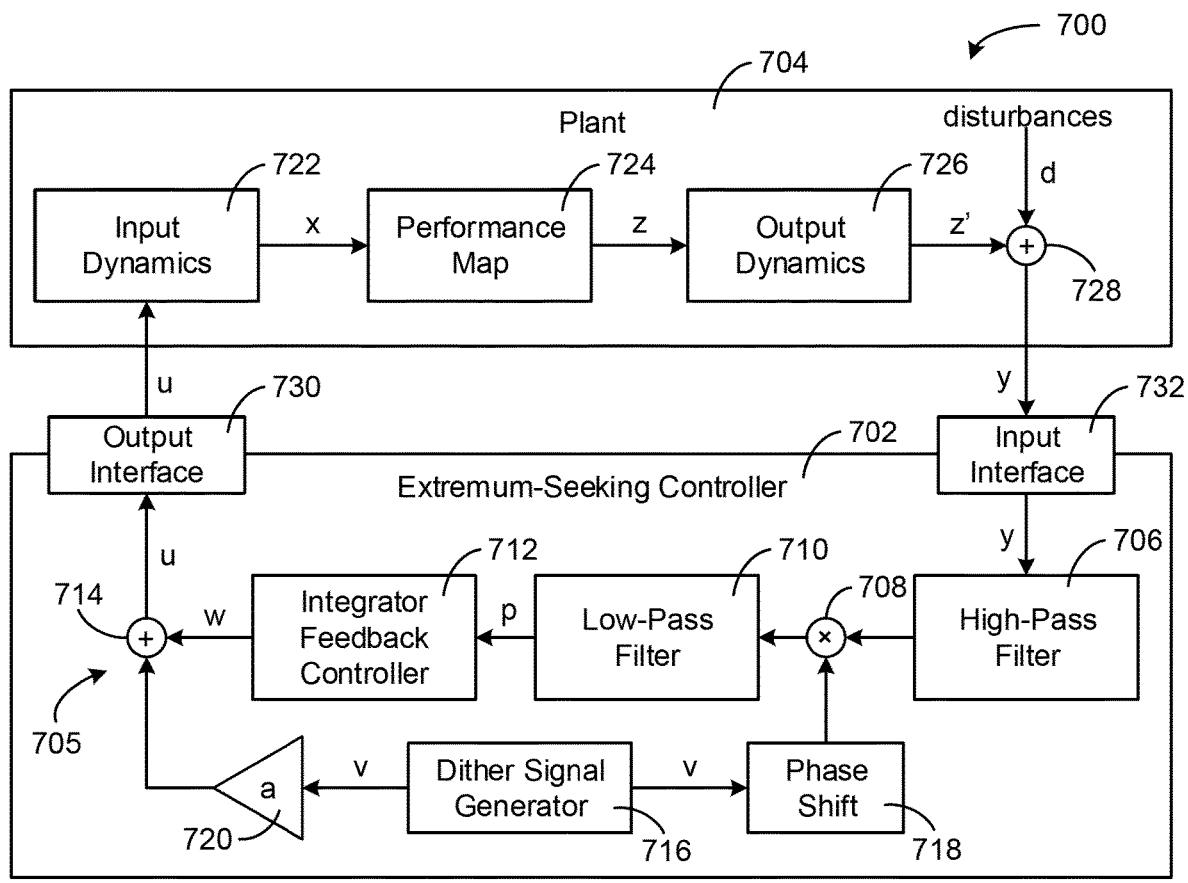
FIG. 7 is a block diagram of another ESC system which uses a periodic dither signal to perturb a control input provided to a plant, according to some embodiments.

Referring now to FIG. 7, a block diagram of another ESC system 700 with a periodic dither signal is shown, according to some embodiments. ESC system 700 is shown to include a plant 704 and an extremum-seeking controller 702. Controller 702 uses an extremum-seeking control strategy to optimize a performance variable y received as an output from plant 704. Optimizing performance variable y can include minimizing y, maximizing y, controlling y to achieve a setpoint, or otherwise regulating the value of performance variable y.

Plant 704 can be the same as plant 604 or similar to plant 604, as described with reference to FIG. 3. For example, plant 704 can be a combination of a process and one or more mechanically-controlled outputs. In some embodiments, plant 704 is an air handling unit configured to control temperature within a building space via one or more mechanically-controlled actuators and/or dampers. In other embodiments, plant 704 can include a chiller operation process, a damper adjustment process, a mechanical cooling process, a ventilation process, or any other process that generates an output based on one or more control inputs.

Plant 704 can be represented mathematically as a combination of input dynamics 722, a performance map 724, output dynamics 726, and disturbances d. In some embodiments, input dynamics 722 are linear time-invariant (LTI) input dynamics and output dynamics 726 are LTI output dynamics. Performance map 724 can be a static nonlinear performance map. Disturbances d can include process noise, measurement noise, or a combination of both. Although the components of plant 704 are shown in FIG. 7, it should be noted that the actual mathematical model for plant 704 does not need to be known in order to apply ESC.

Plant 704 receives a control input u (e.g., a control signal, a manipulated variable, etc.) from extremum-seeking controller 702 via output interface 730. Input dynamics 722 may use the control input u to generate a function signal x based on the control input (e.g., x=f(u)). Function signal x may be passed to performance map 724 which generates an output signal z as a function of the function signal (i.e., z=f(x)). The output signal z may be passed through output dynamics 726 to produce signal z', which is modified by disturbances d at element 728 to produce performance variable y (e.g., y=z'+d). Performance variable y is provided as an output from plant 704 and received at extremum-seeking controller 702. Extremum-seeking controller 702 may seek to find values for x and/or u that optimize the output z of performance map 724 and/or the performance variable y.

Still referring to FIG. 7, extremum-seeking controller 702 is shown receiving performance variable y via input interface 732 and providing performance variable y to a control loop 705 within controller 702. Control loop 705 is shown to include a high-pass filter 706, a demodulation element 708, a low-pass filter 710, an integrator feedback controller 712, and a dither signal element 714. Control loop 705 may be configured to extract a performance gradient p from performance variable y using a dither-demodulation technique. Integrator feedback controller 712 analyzes the performance gradient p and adjusts the DC value of the plant input (i.e., the variable w) to drive performance gradient p to zero.

The first step of the dither-demodulation technique is performed by dither signal generator 716 and dither signal element 714. Dither signal generator 716 generates a periodic dither signal v, which is typically a sinusoidal signal. Dither signal element 714 receives the dither signal v from dither signal generator 716 and the DC value of the plant input w from controller 712. Dither signal element 714 combines dither signal v with the DC value of the plant input w to generate the perturbed control input u provided to plant 704 (e.g., u=w+v). The perturbed control input u is provided to plant 704 and used by plant 704 to generate performance variable y as previously described.

The second step of the dither-demodulation technique is performed by high-pass filter 706, demodulation element 708, and low-pass filter 710. High-pass filter 706 filters the performance variable y and provides the filtered output to demodulation element 708. Demodulation element 708 demodulates the output of high-pass filter 706 by multiplying the filtered output by the dither signal v with a phase shift 718 applied. The DC value of this multiplication is proportional to the performance gradient p of performance variable y with respect to the control input u. The output of demodulation element 708 is provided to low-pass filter 710, which extracts the performance gradient p (i.e., the DC value of the demodulated output). The estimate of the performance gradient p is then provided to integrator feedback controller 712, which drives the performance gradient estimate p to zero by adjusting the DC value w of the plant input u.

Still referring to FIG. 7, extremum-seeking controller 702 is shown to include an amplifier 720. It may be desirable to amplify the dither signal v such that the amplitude of the dither signal v is large enough for the effects of dither signal v to be evident in the plant output y. The large amplitude of dither signal v can result in large variations in the control input u, even when the DC value w of the control input u remains constant. Due to the periodic nature of the dither signal v, the large variations in the plant input u (i.e., the oscillations caused by the dither signal v) are often noticeable to plant operators.

Additionally, it may be desirable to carefully select the frequency of the dither signal v to ensure that the ESC strategy is effective. For example, it may be desirable to select a dither signal frequency $\omega_v$ based on the natural frequency $\omega_n$ of plant 604 to enhance the effect of the dither signal v on the performance variable y. It can be difficult and challenging to properly select the dither frequency $\omega_v$ without knowledge of the dynamics of plant 704. For these reasons, the use of a periodic dither signal v is one of the drawbacks of traditional ESC.

In ESC system 700, the output of high-pass filter 706 can be represented as the difference between the value of the performance variable y and the expected value of the performance variable y, as shown in the following equation:

$$y - E[y] \qquad \text{Output of High-Pass Filter:}$$

where the variable E[y] is the expected value of the performance variable y. The result of the cross-correlation performed by demodulation element 708 (i.e., the output of demodulation element 708) can be represented as the product of the high-pass filter output and the phase-shifted dither signal, as shown in the following equation:

$$(y - E[y])(v - E[v]) \qquad \text{Result of Cross-Correlation:}$$

where the variable E[v] is the expected value of the dither signal v. The output of low-pass filter 710 can be represented as the covariance of the dither signal v and the performance variable y, as shown in the following equation:

$$E[(y - E[y])(v - E[u])] = \text{Cov}(v, y) \qquad \text{Output of Low-Pass Filter:}$$

where the variable E[u] is the expected value of the control input u.

The preceding equations show that ESC system 700 generates an estimate for the covariance Cov(v, y) between the dither signal v and the plant output (i.e., the performance variable y). The covariance Cov(v, y) can be used in ESC system 700 as a proxy for the performance gradient p. For example, the covariance Cov(v, y) can be calculated by high-pass filter 706, demodulation element 708, and low-pass filter 710 and provided as a feedback input to integrator feedback controller 712. Integrator feedback controller 712 can adjust the DC value w of the plant input u in order to minimize the covariance Cov(v, y) as part of the feedback control loop.

Extremum-Seeking Control System for on/Off System

Figure 8:
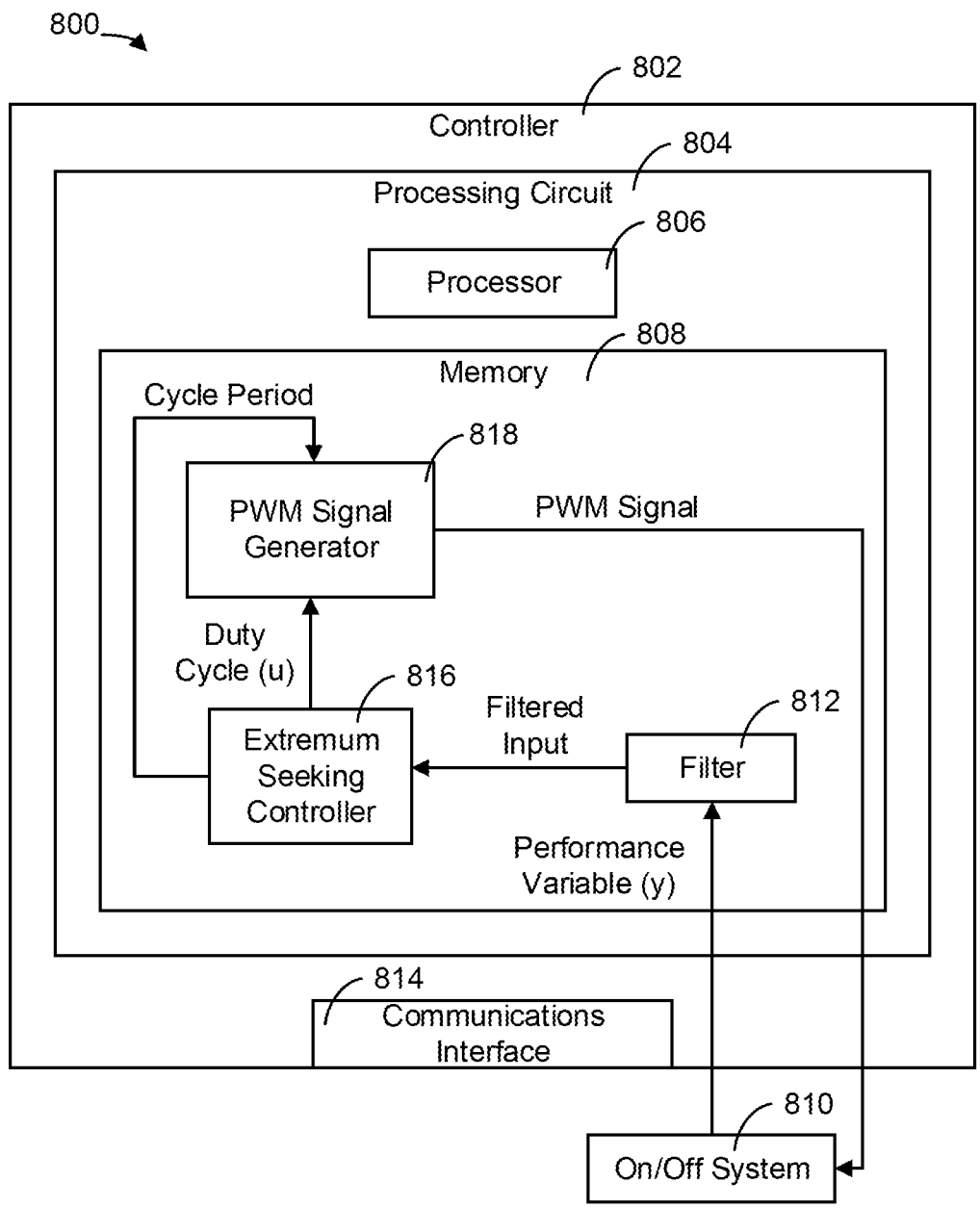
FIG. 8 is a block diagram of another ESC system which uses a pulse width modulation signal to control an on/off system, according to some embodiments.

Referring now to FIG. 8, a control system 800 is shown, according to an exemplary embodiment. Control system 800 is shown to include a controller 802 and an on/off system 810, according to an exemplary embodiment. On/off system 810 can be a two-position system, with the two possible positions being on and off. On/off system 810 may be binary, in that only two settings are possible for the system, on and off. Additionally, on/off system 810 may be a building management system, such as an HVAC system or other similar BMS. ESC systems 600 and 700 of FIG. 6 and FIG. 7, respectively, can also be included in some exemplary embodiments including the components shown in FIG. 8. Other possible embodiments of systems shown in FIG. 8 may include or be related to waterside system 200 which can be used to serve building 10 (FIG. 2), airside system 300 which can be used to serve building 10 (FIG. 3), and the BMS shown in the block diagrams of FIG. 4 and FIG. 5. On/off system 810 may also include one or more two-position valves, single-speed compressors, fans, pumps, and/or other systems or devices with only two possible positions (e.g., open and closed) or operating states (e.g., on and off, active and inactive, etc.).

Controller 802 can be configured to receive a performance variable y from on/off system 810 and can generate and provide a control signal to on/off system 810. In some embodiments, the control signal is a pulse width modulated (PWM) signal having a binary value (e.g., on or off, open or closed, etc.). Controller 802 is shown to include a communications interface 814 and a processing circuit 804 in some embodiments.

Communications interface 814 may facilitate communications between controller 802 and on/off system 810. Interface 814 can be or include wired or wireless communications interfaces (e.g., jacks, antennas, transmitters, receivers, transceivers, wire terminals, etc.) for conducting data communications with on/off system 810 or other external systems or devices. In various embodiments, communications via interface 814 can be direct (e.g., local wired or wireless communications) or via a communications network (e.g., a WAN, the Internet, a cellular network, etc.). For example, communications interface 814 can include an Ethernet card and port for sending and receiving data via an Ethernet-based communications link or network. In another example, communications interface 814 can include a Wi-Fi transceiver for communicating via a wireless communications network, a cellular or mobile phone communications transceiver, or a power line communications interface.

Processing circuit 804 is shown to include a processor 806 and memory 808 in some embodiments. Processing circuit 804 can be communicably connected to communications interface 814 such that processing circuit 804 and the various components thereof can send and receive data via communications interface 814. Processor 806 can be implemented as a general purpose processor, an application specific integrated circuit (ASIC), one or more field programmable gate arrays (FPGAs), a group of processing components, or other suitable electronic processing components.

Memory 808 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 808 can be or include volatile memory or non-volatile memory. Memory 808 can include database components, object code components, script components, or any other type of information structure for supporting the various activities and information structures described in the present application. According to some embodiments, memory 808 is communicably connected to processor 806 via processing circuit 804 and includes computer code for executing (e.g., by processing circuit 804 and/or processor 806) one or more processes described herein.

Memory 808 of the control system 800 is shown to include a filter 812, an extremum-seeking controller 816, and a PWM signal generator 818 in an exemplary embodiment. Filter 812 can receive a performance variable y from on/off system 810 as an input. This performance variable may be a variable which is to be maximized, such as a coefficient of performance or an efficiency rating, for example. Alternatively, this performance variable may include a variable which is to be minimized, such as cost or energy consumption, for example. Filter 812 may include any one or a combination of a variety of filters, examples being low-pass, high-pass, band-pass, averaging and/or notch filters. Filter 812 can be configured to calculate a measure of the performance variable (e.g., an average value) over one or more complete PWM cycles and can provide the measure of the performance variable as a filtered output to extremum-seeking controller 816. In some embodiments, filter 812 serves to smooth the performance variable input received from on/off system 810. Filter 812 may then output a filtered input for extremum-seeking controller 816.

Extremum-seeking controller 816 can receive a filtered input from filter 812 in some embodiments. Extremum-seeking controller 816 may include some or all of the components and/or functionality of extremum-seeking controller 602 of FIG. 6 or extremum-seeking controller 702 of FIG. 7. In some embodiments, the output of extremum-seeking controller 816 (i.e., the manipulated variable u) is a duty cycle ranging between 0-100%. Extremum-seeking controller 816 may generate the duty cycle output in the same way that extremum-seeking controllers 602 and 702 generate their manipulated variables u. For example, extremum-seeking controller 816 may extract the gradient of the filtered input with respect to the duty cycle and can adjust the steady-state value of the duty cycle to drive the gradient to zero. Extremum-seeking controller 816 may superimpose a dither signal onto the steady-state value of the duty cycle to generate the duty cycle output of extremum-seeking controller 816 (i.e., the manipulated variable u). This duty cycle output of the extremum-seeking controller 816 may then be sent as an input to the PWM signal generator 818.

PWM signal generator 818 can receive a duty cycle from extremum-seeking controller 816 as an input. In some embodiments, PWM signal generator 818 functions to generate PWM signal having the duty cycle defined by extremum-seeking controller 816 and with a cycle period defined by the user (or otherwise provided as an input to PWM signal generator 818). In various embodiments, the cycle period can be defined by a user, received from an external system or device, or retrieved from memory 808. PWM signal generator 818 can calculate the pulse width of each period of the PWM signal using the duty cycle input signal and the cycle period, as seen in equation 1 below, where ω is the pulse width, u is the duty cycle input signal as a percentage and C is the cycle period.

$$\omega = 0.01uC \tag{1}$$

PWM signal generator 818 may output a PWM signal that has a pulse width ω according to equation 1 above. In some embodiments, this output PWM signal is sent to on/off system 810, for which the performance can be altered in order to achieve the desired maximization or minimization of the performance variable being monitored and manipulated.

Figure 9:
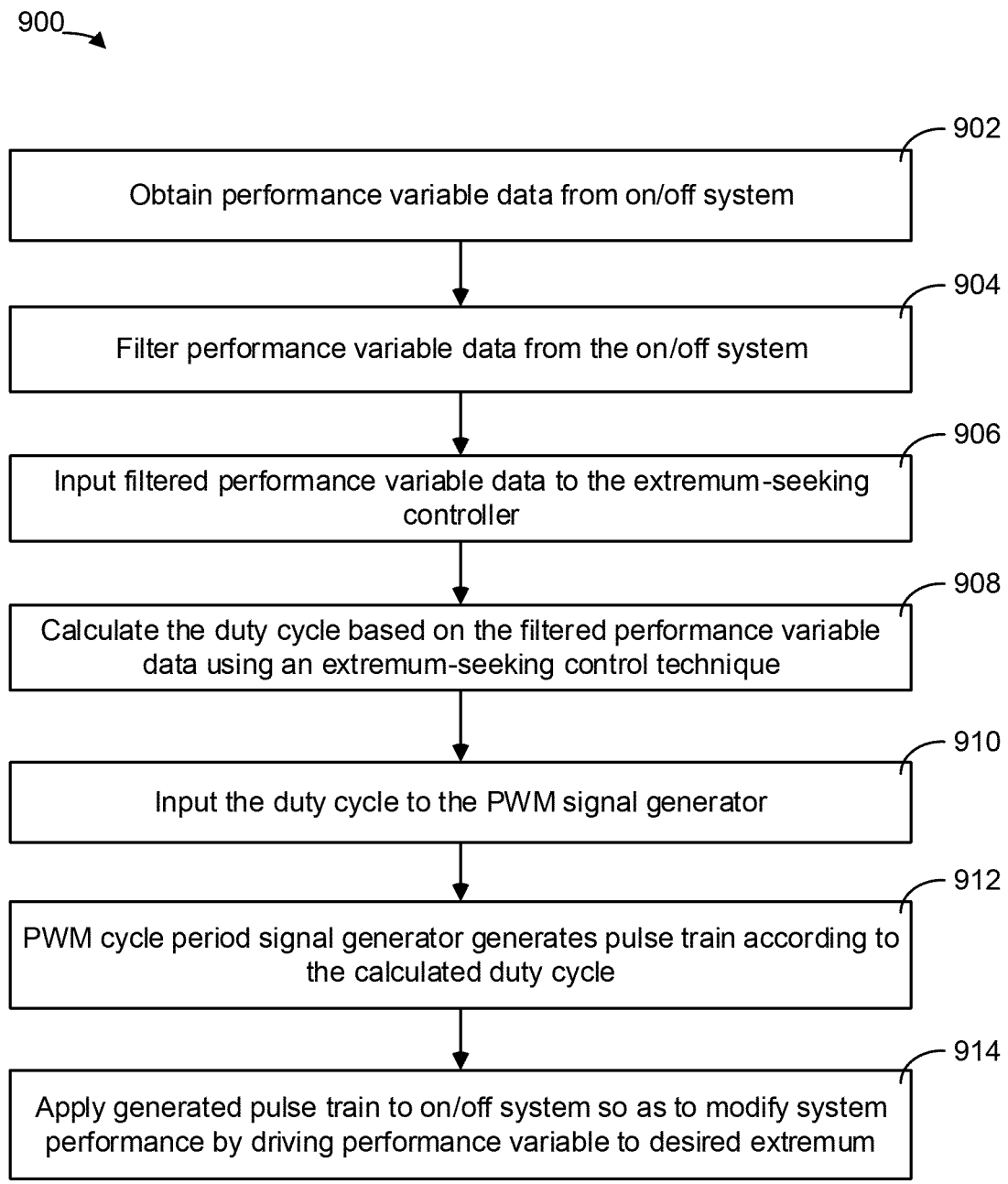
FIG. 9 is a flowchart showing a process for controlling an on/off system using ESC, according to some embodiments.

Referring now to FIG. 9, a process 900 for controlling an on/off system using extremum-seeking control is shown, according to an exemplary embodiment. In some embodiments, process 900 is performed by one or more components of control system 800 (e.g., controller 802), as shown in FIG. 8. Process 900 can include steps taken in the application of extremum-seeking control to on/off systems which may include HVAC systems, two-position valves, single-speed compressors, fans and pumps. Additionally, process 900 may be applied to other similar BMS. ESC systems 600 and 700 of FIG. 6 and FIG. 7, respectively, can also be included in some exemplary embodiments for which process 900 may be applied. Process 900 may also be applied to other systems in some embodiments, for example waterside system 200 which can be used to serve building 10 (FIG. 2), airside system 300 which can be used to serve building 10 (FIG. 3), and the BMS shown in the block diagrams of FIG. 4 and FIG. 5.

Process 900 is shown to include obtaining performance variable data from an on/off system (step 902). Step 902 may include receiving the performance variable from on/off system 810 of FIG. 8. It is desirable for the performance variable to be driven to an extremum in order for optimized use of on/off system 810. Depending on the performance variable, the objective may be to drive the performance variable to a maximum or minimum. For example, if the performance variable obtained from on/off system 810 was a coefficient of performance or a measure of efficiency, it would be desirable to maximize such a performance variable. However, if the performance variable obtained from on/off system 810 was a measure of power consumption or cost, it would be desirable to drive such a variable to a minimum.

Process 900 is shown to include filtering the performance data from the on/off system (step 904). Step 904 can be performed by filter 812, as described with reference to FIG. 8. Filter 812 of step 904 may include a single filter or multiple filters used in combination, and may include a number of possible filters. For example, filter 812 used in step 904 may be a low-pass filter, a band-pass filter, a high-pass filter, a notch filter, a cut filter or an averaging block, among other types of possible filters depending on the embodiment. In some embodiments, step 904 prepares the performance variable data obtained from on/off system 810 for input into extremum-seeking controller 816.

Process 900 is shown to include inputting filtered performance variable data to an extremum-seeking controller (Step 906). In some embodiments, step 906 includes inputting filtered performance variable data into the extremum seeking controller. This may correspond to filter 812 and extremum seeking controller 816 shown in FIG. 8, depending on the embodiment. In some embodiments, the performance variable data obtained from on/off system 810 may be filtered prior to inputting said data into extremum-seeking controller 816 to smooth the data to allow for optimal extremum-seeking control perturbation of the data using a dither signal.

Process 900 is shown to include calculating a duty cycle based on the filtered performance variable data using an extremum-seeking control technique (step 908). In some embodiments, step 908 is performed by extremum-seeking controller 816 as described with reference to FIG. 8. Extremum-seeking controller 816 may determine the duty cycle from the inputted filtered performance variable data, and may also perturb the inputted filtered performance data using a dither signal. In some embodiments, the dither signal used to perturb the input may be a sine wave. The inputted filtered performance variable data is manipulated prior to being inputted to PWM signal generator 818 so as to allow for PWM signal generator 818 to function optimally, according to some embodiments.

Process 900 is shown to include inputting the duty cycle to a PWM signal generator (Step 910). Step 910 may include inputting the duty cycle calculated by the extremum-seeking controller in step 908 to the PWM cycle period generator, depending on the embodiment. Extremum-seeking controller and PWM cycle period generator may correspond to components 816 and 818 of FIG. 8, respectively. In some embodiments, the duty cycle calculated by extremum seeking controller 816 allows for PWM signal generator 818 to generate an appropriate pulse train based on the performance variable signal originally obtained from on/off system 810 and filtered before being inputted to extremum-seeking controller.

Process 900 is shown to include the PWM signal generator generating a pulse train according to the calculated duty cycle (Step 912). In some embodiments, step 912 includes the PWM signal generator taking the inputted duty cycles calculated by the extremum-seeking controller in the previous step and generating a pulse train accordingly. PWM signal generator corresponds to component 818 shown in FIG. 8, according to various embodiments. PWM signal generator 818 may output a pulse train with a cycle period that may be designed by the user. In some embodiments, the pulse width is determined by the input signal, with the input signal being the duty cycle calculated by extremum-seeking controller 816 in the previous step. PWM signal generator 818 may produce a pulse train with a pulse width occupying a percentage of each cycle period corresponding to the value of the duty signal inputted from extremum-seeking controller 816. In some embodiments, the pulses of the pulse train generated by PWM signal generator 818 are constant in amplitude, but the pulse width of each cycle period is dependent on the value of the corresponding portion of the duty cycle. It must also be noted that the pulse width is likely to fluctuate slightly in width as the duty cycle oscillates.

Process 900 is shown to include applying a generated pulse train to the on/off system so as to modify system performance by driving the performance variable to a desired extremum (Step 914). In some embodiments, depending on the performance variable data obtained from the on/off system in step 902, the performance variable is driven to an extremum by the pulse train as it modifies the performance of on/off system 810.

It should be understood that the components included in the steps of process 900 are in no way limiting and may vary according to some embodiments. It should also be understood that process 900 is an ongoing process, with the pulse train generated in step 912 based on the duty cycle generated based on the filtered performance variable data obtained from on/off system 810. It should be understood that the performance variable data may be dynamic and change over time according to operation of on/off system 810 and that as such, the pulse train ultimately generated based on the performance variable data obtained from on/off system 810 may be dynamic as well.

Figure 10A:
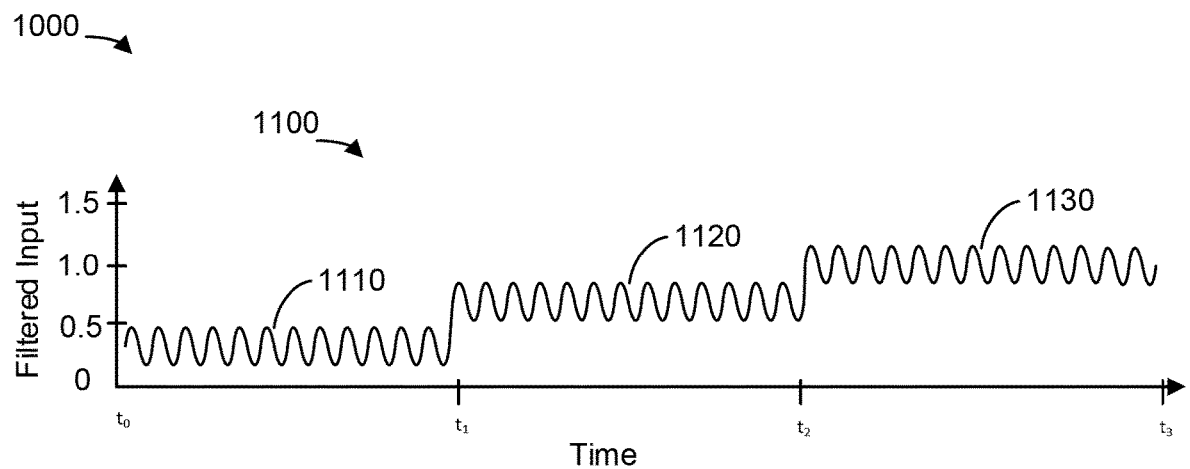
FIG. 10A is a plot showing a filtered input signal plotted over time, according to some embodiments.
Figure 10B:
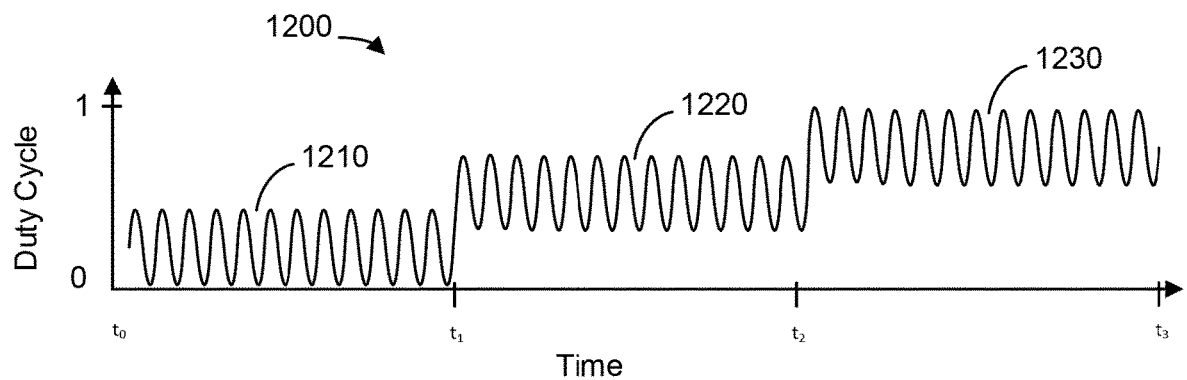
FIG. 10B is a plot showing a duty cycle plotted over time, according to some embodiments.
Figure 10C:
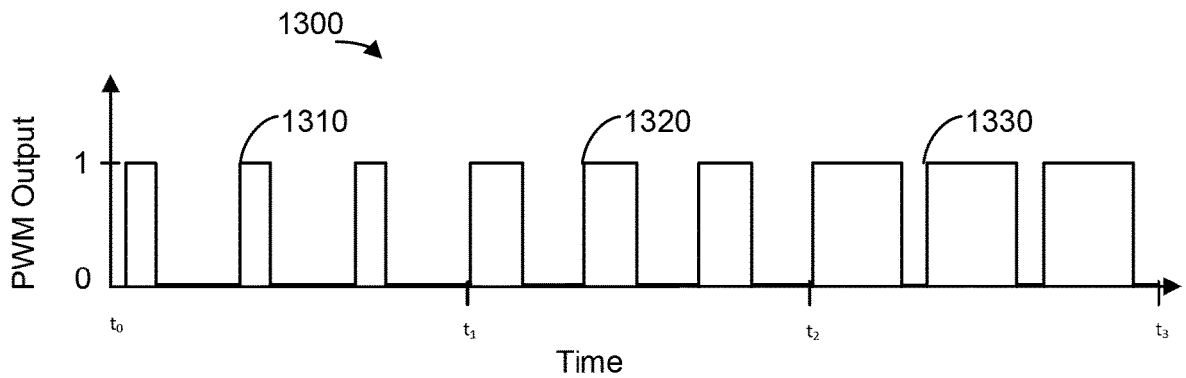
FIG. 10C is a plot showing a pulse width modulated (PWM) output plotted over time, according to some embodiments.

Referring now to FIG. 10A, FIG. 10B, and FIG. 10C plots are shown of a filtered input, a duty cycle, and a PWM output, respectively according to an exemplary embodiment. FIG. 10A-FIG. 10C may include signals plotted over time, with time axis (x-axis) having four marked time points of $t_0$, $t_1$, $t_2$ and $t_3$. These four time points are marked on each of the plots included in FIG. 10A-FIG. 10C, and indicate that the signal activity on each of the three plots corresponds to the signal activity on the other plots in the figure series for the same time interval, according to an exemplary embodiment. For example, the activity of the signal between $t_0$ and $t_1$ on FIG. 10A may relate to the signal activity seen between $t_0$ and $t_1$ on FIG. 10B and FIG. 10C. As such, these specified time points and subsequent time intervals may be referenced in describing FIG. 10A-FIG. 10C. FIG. 10A, FIG. 10B, and FIG. 10C may show data from systems that may include HVAC systems and BMS systems, as well as ESC systems 600 and 700 of FIG. 6 and FIG. 7, respectively. The plots of FIG. 10A, FIG. 10B, and FIG. 10C may also be applicable to other systems in some embodiments, for example waterside system 200 which can be used to serve building 10 (FIG. 2), airside system 300 which can be used to serve building 10 (FIG. 3), and the BMS shown in the block diagrams of FIG. 4 and FIG. 5.

Referring now to FIG. 10A, a filtered input signal 1100 is shown over time, according to an exemplary embodiment. Filtered input signal 1100 of FIG. 10A may correspond to the filtered input sent from filter 812 to extremum-seeking controller 816 in FIG. 8. As mentioned previously, the filtered input of FIG. 8 may include filtered performance variable data initially sent from on/off system 810 to filter 812. Filter 812, which may be comprised of one or more of a variety of filter types, filters the performance variable data from on/off system 810 and this product of filter 812 serves as the filtered input of extremum-seeking controller 816, as seen in FIG. 8, according to an exemplary embodiment. As such, filtered input signal 1100 seen in FIG. 10A may be representative of the output of filter 812 of FIG. 8. In some embodiments, filtered input signal 1100 is shown as a sinusoidal signal over three time intervals defined as $t_0$-$t_1$, $t_1$-$t_2$, and $t_2$-$t_3$. As seen in FIG. 10A, filtered input signal 1100 may have three different average amplitudes wherein each of the different average amplitudes may correspond to one of the three defined time intervals, each of which may relate to the signals of FIG. 10A and FIG. 10C seen over the corresponding time interval.

Referring now to FIG. 10B, a duty cycle signal 1200 is shown over time, according to an exemplary embodiment. Duty cycle signal 1200 may correspond to the duty cycle sent as an output of extremum-seeking controller 816 to PWM signal generator 818 of FIG. 8. As mentioned previously, the duty cycle may be represented as a percentage or as a ratio, and as such the y-axis of FIG. 10B is seen to include a scale ranging from 0-1, which can be indicative of percentages form 0-100%, according to an exemplary embodiment. According to some embodiments, just as in FIG. 10A, the three defined time intervals $t_0$-$t_1$, $t_1$-$t_2$, and $t_2$-$t_3$ serve to identify three different average amplitudes of duty cycle signal 1200 and thus relates to the signals of FIG. 10A and FIG. 10C.

Referring now to FIG. 10C, a PWM output signal 1300 is shown over time, according to an exemplary embodiment. PWM output signal 1300 may correspond to the PWM signal sent as an output of PWM signal generator 818 to on/off system 810 of FIG. 8. As mentioned previously, PWM output signal 1300 can have a cycle period defined by the user. FIG. 10C shows three different pulse widths over three different time intervals of $t_0$-$t_1$, $t_1$-$t_2$, and $t_2$-$t_3$ for a constant cycle period, according to an exemplary embodiment. Each pulse of FIG. 10 may be shown to have an amplitude of 1 regardless of the pulse width, as pulse width may be the only variable of the pulse. The signal activity of PWM output signal 1300 seen over the three different time intervals of FIG. 10C relate to the signal activity seen on FIG. 10A and FIG. 10B over the corresponding time intervals, according to an exemplary embodiment.

Filtered input signal 1100 of FIG. 10A may vary over an arbitrary scale ranging from 0-1.5. A first filtered input portion 1110 is defined by the time interval $t_0$-$t_1$, according to an exemplary embodiment. First filtered input portion 1110 may be representative of performance data obtained from on/off system 810 after being filtered by filter 812 of FIG. 8. A second filtered input portion 1120 may be defined by the time interval $t_1$-$t_2$ and may show an increased average amplitude when compared to first input signal portion 1100. Similarly, a third filtered input portion 1130 may be defined by the time interval $t_2$-$t_3$ and may show an increased average amplitude when compared to both first input signal portion 1100 and second input signal portion 1110. This is to say that filtered input signal 1100 may increase over time, as seen in FIG. 10A, may decrease over time, or may otherwise fluctuate or remain constant, according to an exemplary embodiment.

Duty cycle signal 1200 of FIG. 10B may vary in average amplitude over time similar to filtered input signal 1100 of FIG. 10A. Duty cycle signal 1200 is showed to vary in amplitude between 0-1, which can also be interpreted as 0-100%, according to an exemplary embodiment. A first duty cycle portion 1210 may exist over the time interval $t_0$-$t_1$. First duty cycle signal portion 1210 may correspond to first filtered input portion 1110 seen over the same time interval, $t_0$-$t_1$. Duty cycle signal 1200 may be produced by extremum-seeking controller 816 of FIG. 8, and may rely on the filtered input signal 1100 produced by filter 812 also seen in FIG. 8. As filtered input signal 1100 may increase in average amplitude over the three time intervals of FIG. 10A, so too may the average amplitude of duty cycle signal 1200 in FIG. 10B. This corresponding signal activity may not be random, and may be indicative of the directly proportional relationship between filtered input signal 1100 and duty cycle signal 1200. The same can be seen for the increase in average amplitude of filtered input signal 1100 as evidenced by the activity of second filtered input portion 1120 in comparison to first filtered input portion 1110, and also by the activity of third filtered input portion 1120 in comparison to second filtered input portion 1120, according to an exemplary embodiment. Similarly, the corresponding signal activity of duty cycle signal 1200 can be seen by comparing the average amplitude of second duty cycle portion 1220 which is shown to have increased relative to first duty cycle portion 1210, as well as third duty cycle portion 1230 which is shown to have increased relative to second duty cycle portion 1220, according to an exemplary embodiment. That is to say that as filtered input signal 1100 may fluctuate over time, so too may duty cycle signal 1200 in a proportional manner.

FIG. 10C shows PWM output signal 1300 comprising three components, the components being a first PWM output portion 1310, a second PWM output portion 1320, and a third PWM output portion 1330, according to an exemplary embodiment. PWM output signal 1300 of FIG. 10C may vary in pulse width over the three time intervals, but in contrast to the filtered input signal 1100 of FIG. 10A and duty cycle signal of FIG. 10B, the amplitude of the PWM output signal 1300 of FIG. 10C may remain constant. Each time interval of FIG. 10C, seen as $t_0$-$t_1$, $t_1$-$t_2$, and $t_2$-$t_3$ includes 3 cycle periods, according to an exemplary embodiment. As such, each of the aforementioned time intervals may be equal in duration, despite possibly comprising pulses of varying widths. While the pulses vary in width, the cycle period remains constant with the pulse making up varying portions of the total cycle period, according to an exemplary embodiment. Similar to the relationship between the corresponding time intervals seen in FIG. 10A and FIG. 10B, the corresponding time intervals seen in FIG. 10B and FIG. 10C may also relate. As duty cycle signal 1200 may increase in average amplitude from first duty cycle portion 1210 to third duty cycle portion 1230, so too may the width of PWC output signal 1300 from first PWM output portion 1310 to third PWM output portion 1330. With the increase in average amplitude of duty cycle signal 1200, there may be a proportional increase in PWM output signal pulse width 1300. This relationship can be attributed to the PWM signal generator of FIG. 8, as the proportional and controlled PWM output signal 1200 is sent to on/off system 810 to regulate operation, according to an exemplary embodiment.

While the pulses of PWM output signal 1300 of FIG. 10C are constant in size for each of the three time intervals seen on the figure for an exemplary embodiment, it should be noted that such pulses can vary in width as they may be based on duty cycle signal 1200 which can fluctuate constantly and as such, so can pulse width. The pulse width of PWM output signal 1300 is expected to have slight increases and decreases due to the oscillation of duty cycle signal 1200 even if the average amplitude of duty cycle signal 1200 is relatively constant, according to an exemplary embodiment. As such, the amplitude of the pulses of the PWM output signal 1300 may remain constant, and the width of said pulses can vary slightly with possible minor oscillation of duty cycle signal 1200.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An extremum-seeking control system comprising:
an on/off system operable to affect a variable state or condition of a building by switching between an on state and an off state;
a controller configured to operate the on/off system by providing a pulse width modulated (PWM) control signal having a duty cycle to the on/off system, the PWM control signal causing the on/off system to operate to affect the variable state or condition of the building;
wherein the controller is configured to generate the PWM control signal by:
receiving a performance variable as feedback from the on/off system;
extracting a gradient of the performance variable with respect to the duty cycle;
modulating the duty cycle using an extremum-seeking control technique to determine an optimal value of the duty cycle that drives the gradient toward zero; and
generating the PWM control signal such that each period of the PWM control signal has a pulse width proportional to the duty cycle.

2. The extremum-seeking control system of claim 1, the controller comprising one or more filters configured to process the performance variable feedback from the on/off system before the controller extracts the gradient of the performance variable with respect to the duty cycle.

3. The extremum-seeking control system of claim 1, wherein the period of the PWM control signal is defined by a user.

4. The extremum-seeking control system of claim 1 wherein the PWM control signal generated is a pulse train, with each pulse of the pulse train having a constant amplitude.

5. The extremum-seeking control system of claim 1, wherein the pulse width of a pulse train is determined by an input signal such that a value of the duty cycle will be equal to a percentage of a cycle period occupied by a pulse.

6. The extremum-seeking control system of claim 1, wherein the controller is configured to:
identify a change in the duty cycle resulting from modulating the duty cycle to drive the gradient toward zero; and
update the pulse width such that the pulse width is maintained proportional to the duty cycle after the change in the duty cycle.

7. The extremum-seeking control system of claim 1, wherein the controller is configured to:
determine a steady-state value of the duty cycle that drives the performance gradient toward zero; and
perturb the steady-state value of the duty cycle with a dither signal to determine the duty cycle of the PWM control signal.

8. The extremum-seeking control system of claim 1, wherein the controller is configured to drive the performance variable toward an extremum by driving the gradient toward zero, the extremum comprising a maximum or minimum of the performance variable.

9. The extremum-seeking control system of claim 1, wherein one or more filters receive and process the performance variable from the on/off system prior to a calculation of the duty cycle.

10. The extremum-seeking control system of claim 1, wherein the PWM control signal is continuously adjusted and outputted to the on/off system for a period equal to that for which the performance variable is received as feedback.

11. A method for system control comprising:
affecting a variable state or condition of a building by switching between an on state and an off state using an on/off system;
operating a controller to provide a pulse width modulated (PWM) control signal having a duty cycle to the on/off system, the PWM control signal causing the on/off system to operate to affect the variable state or condition of the building;
wherein operating the controller comprises:
receiving a performance variable as feedback from the on/off system;
extracting a gradient of the performance variable with respect to the duty cycle;
modulating the duty cycle using an extremum-seeking control technique to determine an optimal value of the duty cycle that drives the gradient toward zero; and
generating the PWM control signal such that each period of the PWM control signal has a pulse width proportional to the duty cycle.

12. The method of claim 11, wherein the performance variable received from the on/off system is processed by one or more filters prior to extraction of the gradient of the performance variable with respect to the duty cycle.

13. The method of claim 11, the generating of the PWM control signal is determined by an input signal such that a value of the duty cycle will be equal to a percentage of a cycle period occupied by a pulse.

14. The method of claim 11, wherein a cycle period of the PWM control signal is user-defined.

15. The method of claim 11, wherein widths of pulses of the generated PWM control signal are determined such that a value of the duty cycle will be equal to the pulse width as a percentage of a cycle period.

16. The method of claim 11, wherein operating the controller includes:
identifying a change in the duty cycle resulting from modulating the duty cycle to drive the gradient toward zero; and
updating the pulse width such that the pulse width is maintained proportional to the duty cycle after the change in the duty cycle.

17. The method of claim 11, wherein the PWM control signal generated has a constant amplitude.

18. The method of claim 11, wherein extracting the gradient of the performance variable with respect to the duty cycle includes perturbation using a dither signal.

19. The method of claim 11, wherein determining the optimal value of the duty cycle corresponds to a PWM control signal configured to drive the performance variable to a desired extremum.

20. The method of claim 11, wherein generating the PWM control signal is continuous, the PWM control signal being adjusted and outputted to the on/off system for a period equal to that for which the performance variable is received as feedback.

* * * * *